United States Patent Office 3,037,949
Patented June 5, 1962

3,037,949
PRINTING INK COMPOSITION AND PROCESS FOR PRODUCING THE SAME
Alberto Bonvicini, Terni, Italy, assignor to Montecatini Societa Generale per l'Industria Mineraria e Chimica, Milan, Italy
No Drawing. Filed Apr. 4, 1958, Ser. No. 726,313
Claims priority, application Italy Apr. 10, 1957
9 Claims. (Cl. 260—4)

This invention relates to a new ink and more particularly to a new ink for printing on articles formed from synthetic resins and particularly from polymeric olefins.

As is well known, despite the comparatively widespread use of articles formed from synthetic resins, the use of such articles is neverthless limited by lack of affinity which the resins exhibit for the available printing inks and the fact that printed matter does not adhere sufficiently tenaciously to the resins.

The articles formed from synthetic resins generally show this lack of receptivity for the printing inks that have been available up to now, due to the substantially non-porous physical structure of the resins. However, the problem of insuring adhesion of printed matter to the shaped articles is particularly acute in the case of articles formed from polymeric olefins. In addition to the substantially non-porous physical structure of the polymeric olefins, such as polyethylene and at least prevailingly isotactic polypropylene, those polymers contain no surface active groups which are capable of fixing substances which are chemically different from the polymer.

It is an object of this invention therefore, to provide a new printing ink which has an affinity for the polymeric olefins.

Another object is to provide a new ink which, when printed on an article formed from a polymeric olefin, adheres permanently to the article.

These and other objects are accomplished by this invention in accordance with which it is found that certain polymers which have physical and chemical properties similar to those of the poly (alpha-olefins) capable of being formed into shaped articles and have a special affinity for those polymers and the inherent property of adhering tenaciously to the shaped articles thereof, are also compatible with the dyes and pigments conventionally used in printing inks and can be used, therefore, to fix the dye or pigment permanently on the articles.

The polymer included in the printing ink as an essential component thereof and as the primary fixative for the pigment, is a linear, regular head-to-tail low or medium molecular weight polymer of an alpha-olefin having the Natta atactic structure, in particular polymers of propylene or butene and mixtures thereof in any proportion. The atactic polymers have an irregular steric structure and, assuming the macromolecule main chain to be fully extended in a plane, the R groups and the hydrogen atoms bound to the tertiary asymmetric carbon atoms of adjacent monomeric units are randomly distributed on the two sides of the plane.

The amount of the substantially atactic poly (alpha-olefin) to be used in preparing the ink is not rigidly fixed and may be varied. However, the amount thereof used should not be less than 10% by weight, based on the total solids weight of the composition.

The printing ink of the invention may consist of the coloring matter (dye or pigment), the low or medium molecular weight substantially atactic poly (alpha-olefin) and a suitable solvent or diluent.

It is also within the purview of the invention to incorporate in the printing ink composition, in addition to the dye or pigment and the poly (alpha-olefin) which is the essential, primary fixative for the dye or pigment, paraffin and a natural or synthetic rubber in amounts sufficient to regulate the viscosity of the composition as desired, and a small proportion (3–5%) of one or more other resinous materials which improve the initial adhesion of the composition to the surfaces to which the ink is to be applied. The other synthetic resins which may be used for this purpose include the following: cumarone-indene resins, phenol-modified cumarone-indene resins, natural resins, the zinc salts of resin acids, phenolformaldehyde resins, glycerophthalic resins, etc. The addition of one or more of the mentioned resins to the printing ink is of particular value when the article to be printed is a film of a fill-forming polymeric olefin.

The several components of the composition can be dissolved in a suitable solvent which may be, for example, chloroform, Vaseline, paraffinic hydrocarbons, petroleum fractions, toluene, xylene, tetrachloro-ethane, o-dichlorobenzene, α-chloro-naphthalene, dibromo-m-ethylene, cyclohexanone, cyclopentanone, methylethylketone, cyclohexanol, tetrahydronaphthalene, decahydronaphthalene, chlorobenzene, tetrachloroethylene, trichloroethylene, etc.

The amount of solvent used can be varied over a wide range, depending on the intended use of the printing ink, that is, depending on whether a more or less, fluid ink is required, preferably the solid content is from 1–70%. The particular solvent itself is selected, on the other hand, on the basis of the viscosity, adhesiveness and drying properties required, and depends on the solvent power and volatility of the solvent.

Any solvent which dissolves the substantially atactic poly (alpha-olefin) or the poly (alpha-olefin) plus the other ingredients of the composition as aforesaid, may be used in making up the composition, being selected, as mentioned, on the basis of the viscosity, adhesiveness and drying properties required for the ink. Since the present printing inks are solutions, instead of dispersions, no previous grinding or mixing treatments of the ingredients are required and the inks can be prepared in a very simple manner.

In general, it is sufficient to heat the solvent containing the amorphous, low or medium molecular weight poly (alpha-olefin) at the boiling point of the solvent for about 30 minutes, in order to dissolve the polymer completely. In general, also, the other ingredients mentioned herein are dissolved under those conditions. After the solution is obtained, the pigment or dye can be added. The resulting printing ink is a stable solution which shows no tendency to separate into phases, with settling out of a solid residue, even when it is allowed to stand for long periods of time.

Printing of the solution on the surface of the shaped article does not require any particular precautions. The ink can be applied to the article by any of the known methods of printing, engraving, surface-printing, lithography, or hand printing. After the ink has been applied, the article can be left to dry in the air at the temperature and for the time indicated by the volatility of the solvent.

The amount of dye or pigment incorporated in the composition can be varied, depending on the particular dye or pigment selected and the intensity of color desired.

The present ink is especially adapted for application to the surface of articles formed from artificial of synthetic resins and particularly to films formed of cellulose acetate, polyesters, chlorovinyl polymers and poly-olefins. However, it is also useful for printing fabrics as well as surfaces comprising metal, glass, wood and paper.

When the articles printed with the present printing ink are subjected to the standard test consisting of applying a strip of adhesive tape to a printed portion and stripping it off quickly in a vertical direction, they show very good adhesion of the print, which is not damaged as a result of the test. Fabrics printed with these new inks show very good fastness to washing and rubbing.

The following are typical printing ink compositions which are given to illustrate the invention and are not intended to be limiting.

I. *Inks for Synthetic Resin Films, Glass Paper, etc.*

Parts by weight (a)

| | |
|---|---|
| Polypropylene (intrinsic viscosity=0.57) | 10 |
| Paraffin (or tragacanth) | 5 |
| Chloroform | 40 |
| n-Heptane | 40 |
| Carbon black (or other pigment) | 5 |

(b)

| | |
|---|---|
| Polypropylene (intrinsic viscosity=0.45) | 15 |
| Tetrachloroethylene | 80 |
| Cadmium green | 5 |

(c)

| | |
|---|---|
| Polypropylene (intrinsic viscosity=0.57) | 20 |
| Paraffin | 5 |
| Petroleum fraction, B.P. 180–200° C. | 70 |
| Monastral solid blue, (C.I. Pigment Blue 15) | 5 |

(d)

| | |
|---|---|
| Polybutene (intrinsic viscosity=0.49) | 10 |
| Polypropylene (intrinsic viscosity=0.45) | 5 |
| Tetrachlorethylene | 80 |
| Aluminum powder | 5 |

(e)

| | |
|---|---|
| Polybutene (intrinsic viscosity=0.49) | 15 |
| n-Heptane | 80 |
| Vinamon Red 2GS, (C.I. Pigment Red 104) | 3 |
| Titanium dioxide | 2 |

II. *Printing Inks for Fabric*

(a)

| | |
|---|---|
| Setacyl Yellow 3 G, (C.I. Disperse Yellow 20) | 5 |
| Polypropylene (intrinsic viscosity=0.45) | 40 |
| Tetrachlorethylene | 55 |

(b)

| | |
|---|---|
| Cibacet Violet B, (C.I. Disperse Violet 4) | 5 |
| Polypropylene (intrinsic viscosity=0.45) | 40 |
| Toluene | 55 |

NOTE.—The intrinsic viscosity of the poly (alpha-olefins) shown in the examples was determined in tetralin at 135° C.

The substantially atactic poly (alpha-olefin) used as the essential, primary fixative for the dye or pigment in the present printing inks may have a molecular weight of 10,000 to 70,000.

Various changes may be made in details in practicing the invention without departing from the spirit thereof, and it is intended to include in the scope of the appended claims all such modifications as may be apparent to those skilled in the art.

What is claimed is:

1. A printing ink consisting of a solution the essential ingredients of which are a coloring agent selected from the group consisting of dyes and pigments, at least one substantially atactic poly (alpha-olefin) selected from the group consisting of polypropylene and polybutene-1, said poly(alpha-olefin) having a molecular weight from 10,000 to 70,000 and being present in a concentration of not less than 10% by weight of total solids; and a solvent in which both the coloring agent and poly (alpha-olefin) are soluble.

2. The printing ink as described in claim 1, wherein the atactic poly(alpha-olefin) is polypropylene.

3. The printing ink as described in claim 1 wherein the atactic poly(alpha-olefin) is polybutene-1.

4. The printing ink as described in claim 1, wherein the atactic poly(alpha-olefin) is a mixture of polypropylene and polybutene-1.

5. A printing ink consisting essentially of a coloring agent selected from the group consisting of dyes and pigments, at least one substantially atactic poly(alpha-olefin) selected from the group consisting of polypropylene and polybutylene-1, said poly(alpha-olefin) having a molecular weight from 10,000 to 70,000 and being present in a concentration of not less than 10% by weight of total solids; a viscosity regulator selected from the group consisting of paraffin, natural rubber and synthetic rubber; and a solvent in which all of said components of the ink are soluble.

6. A printing ink consisting essentially of a coloring agent selected from the group consisting of dyes and pigments, at least one substantially atactic poly(alpha-olefin) selected from the group consisting of polypropylene and polybutyene-1, said poly(alpha-olefin) having a molecular weight from 10,000 to 70,000 and being present in a concentration of not less than 10% by weight of total solids; an adhesion-improving resin present in a concentration of from 3–5% by weight of total solids and selected from the group consisting of cumarone-indene resins, phenol-modified cumarone-indene resins, natural resins, zinc salts of resin acids, phenol-formaldehyde resins, and glycerol-phthalic resins, and a solvent in which all of said components are soluble.

7. A printing ink composition consisting essentially of a coloring agent selected from the group consisting of dyes and pigments, at least one substantially atactic poly (alpha-olefin) selected from the group consisting of polypropylene and polybutene-1, said poly(alpha-olefin) having a molecular weight from 10,000 to 70,000 and being present in a concentration of not less than 10% by weight of total solids; a viscosity regulator selected from the group consisting of paraffin, natural rubber and synthetic rubber; an adhesion-improving resin selected from the group consisting of cumarone-indene resins, phenol-modified cumarone-indene resins, natural resins, the zinc salts of resin acids, phenol-formaldehyde resins and glycerol-phthalic resins, said adhesion-improving resin being present in a concentration of 3–5% by weight of total solids; and a solvent in which all of said components are soluble.

8. A process for preparing printing inks comprising the steps of (1) adding to a solvent at least one substantially atactic poly(alpha-olefin) selected from the group consisting of polypropylene and polybutene-1, said poly (alpha-olefin) having a molecular weight from 10,000 to 70,000 and being present in said printing ink in a concentration of not less than 10% by weight of total solids, (2) heating the solvent and poly(alpha-olefin) for a sufficient time to obtain a clear solution, and (3) adding a coloring agent selected from the group consisting of printing ink dyes and pigments to said clear solution.

9. The process as described in claim 8, wherein the heating step (2) is conducted at the boiling temperature of the mixture of solvent and poly(alpha-olefin).

References Cited in the file of this patent

UNITED STATES PATENTS

| 2,558,053 | Lee | June 26, 1951 |
| 2,612,480 | May | Sept. 30, 1952 |
| 2,618,574 | Pavlic | Nov. 18, 1952 |
| 2,628,208 | Loukomsky | Feb. 10, 1953 |

UNITED STATES PATENT OFFICE
CERTIFICATE OF CORRECTION

Patent No. 3,037,949  June 5, 1962

Alberto Bonvicini

It is hereby certified that error appears in the above numbered patent requiring correction and that the said Letters Patent should read as corrected below.

Column 4, line 14, for "polybutylene-1" read -- polybutene-1 --; line 25, for "polybutyene-1" read -- polybutene-1 --.

Signed and sealed this 30th day of October 1962.

(SEAL)
Attest:

ERNEST W. SWIDER
Attesting Officer

DAVID L. LADD
Commissioner of Patents